United States Patent
Nelson et al.

(10) Patent No.: US 9,828,559 B2
(45) Date of Patent: Nov. 28, 2017

(54) FUEL ADDITIVES, FUELS, METHODS OF MAKING AND USING SAME

(75) Inventors: Lloyd A. Nelson, Savannah, GA (US); Gary Reed, Orange Park, FL (US); Gregory Achatz, Ponte Vedre Beach, FL (US)

(73) Assignee: Kraton Chemical, LLC, Jacksonville, FL (US)

( * ) Notice: Subject to any disclaimer, the term of this patent is extended or adjusted under 35 U.S.C. 154(b) by 557 days.

(21) Appl. No.: 13/985,251

(22) PCT Filed: Feb. 14, 2012

(86) PCT No.: PCT/US2012/025084
§ 371 (c)(1),
(2), (4) Date: Jun. 29, 2015

(87) PCT Pub. No.: WO2012/112574
PCT Pub. Date: Aug. 23, 2012

(65) Prior Publication Data
US 2016/0312138 A1     Oct. 27, 2016

Related U.S. Application Data

(60) Provisional application No. 61/442,466, filed on Feb. 14, 2011.

(51) Int. Cl.
| | |
|---|---|
| *C10L 1/18* | (2006.01) |
| *C10L 10/18* | (2006.01) |
| *C11C 1/02* | (2006.01) |
| *C11C 1/10* | (2006.01) |
| *C11C 3/00* | (2006.01) |

(Continued)

(52) U.S. Cl.
CPC ................... *C10L 1/18* (2013.01);
*C10L 1/14* (2013.01);
*C10L 1/24* (2013.01); *C10L 10/08* (2013.01);
*C10L 10/14* (2013.01); *C11C 1/025* (2013.01);
*C11C 1/10* (2013.01); *C11C 3/003* (2013.01);
*C10L 1/19* (2013.01); *C10L 1/2418* (2013.01);
*C10L 2200/0476* (2013.01);
(Continued)

(58) Field of Classification Search
USPC .......................................... 44/385; 530/205
See application file for complete search history.

(56) References Cited

U.S. PATENT DOCUMENTS

| | | |
|---|---|---|
| 2,166,812 A | 7/1939 | Gayer |
| 2,395,284 A | 2/1946 | Lovas et al. |

(Continued)

FOREIGN PATENT DOCUMENTS

JP     2008031362 A     2/2008

OTHER PUBLICATIONS

International Search Report for PCT/US2012/025084, dated May 31, 2013, 2 pages.
JP 2008031362.

*Primary Examiner* — Ellen McAvoy
*Assistant Examiner* — Chantel Graham (57) ABSTRACT

A method of producing a low sulfur tall oil fatty acid by first esterifying the tall oil fatty acid, followed by distillation of the tall oil fatty acid ester, followed by saponification and acidulation to provide a low sulfur tall oil fatty acid. A fuel additive comprising tall oil fatty acid and a sulfur compound, wherein the sulfur compound comprises from about 0.1 to about 20 ppm of the additive. A fuel comprises a hydrocarbon fuel component and the fuel additive.

11 Claims, 3 Drawing Sheets

(51) Int. Cl.
*C10L 1/24* (2006.01)
*C10L 10/14* (2006.01)
*C10L 1/14* (2006.01)
*C10L 10/08* (2006.01)
*C10L 1/19* (2006.01)

(52) U.S. Cl.
CPC ....... *C10L 2230/22* (2013.01); *C10L 2290/06* (2013.01); *C10L 2290/543* (2013.01); *Y02E 50/13* (2013.01)

(56) References Cited

U.S. PATENT DOCUMENTS

| | | |
|---|---|---|
| 2,423,232 A | 6/1947 | Freeman et al. |
| 2,437,643 A | 3/1948 | Houpt |
| 2,640,823 A | 6/1953 | Gloyer |
| 3,859,270 A | 1/1975 | Zvejnieks |
| 2007/0049727 A1 | 3/2007 | Pollock |
| 2010/0261800 A1* | 10/2010 | Daniel .................. C07C 29/149 518/702 |

* cited by examiner

FUEL ADDITIVES, FUELS, METHODS OF MAKING AND USING SAME

RELATED APPLICATION DATA

This application claims priority from U.S. Provisional Patent Application 62/442466.

BACKGROUND OF THE INVENTION

1. Field of the Invention

The present invention relates to fuel additives, fuels, and to methods of making and using same. In another aspect, the present invention relatives to low sulfur fuel additives, low sulfur fuels, and to methods of making and using same. In even another aspect, the present invention relates to fuel additives having 15 ppm sulfur at most, fuels having 15 ppm sulfur at most, and to methods of making and using same.

2. Background

Economic and environmental considerations are creating great market demand for renewable sources of raw materials, such as those utilized in the transportation industry. Examples include the fuel and fuel package market. Specifically, environmental concerns have led to regulatory mandates requiring sulfur levels to be reduced in fuels. However, low sulfur fuels are known to be less lubricating they are typically treated with lubricity additives. However, fuel additives, including lubricity additives, are also subject to regulatory standards relating to reduced sulfur levels. Specifically, U.S. regulations require that most fuel additives contain no more than 15 ppm sulfur.

The fuel industry in the United States has been attempting to meet these regulatory mandates that require the use of fully formulated ultra low sulfur diesel fuels (ULSD) with a maximum of 15 ppm sulfur content. The requirement is quite stringent requiring not only the final produced fuel, but also requiring that each component going into such fuels have a sulfur content of 15 ppm maximum.

As an additional requirement, many fuel compositions and fuel additives, including lubricity additives, are stored in outdoor tanks and therefore need to remain liquid and at a low viscosity even at low temperatures. Many commonly known lubricity additives, despite having excellent lubricating properties, do not remain free of crystals at low temperatures.

Tall oil fatty acids (TOFAs) are considered valuable for use in various applications due to their good lubricating properties. Tall oil is a by-product in the manufacture of paper pulp by digestion of wood with alkaline solutions of sodium sulfide. Tall oil fatty acids may be isolated from the tall oil using various processing techniques. However, sulfur species are introduced into tall oil products during the Kraft process, which includes the addition of sodium sulfide and sodium hydroxide to wood chips for digestion, and then the neutralization/acidification of the basic mixture with sulfuric acid. Both of these processes can generate sulfur species, both organic and/or inorganic, which are carried along with black liquor soap, and then into the crude tall oil (CTO). Further refinement through fractional distillation of the CTO generally concentrates the sulfur species into specific product streams (pitch, rosin, and heads); however it does not eliminate the sulfur species from TOFA.

Thus, tall oil fatty acids often contain undesirably high levels of sulfur that is introduced during the pulping process. Furthermore, tall oil fatty acids, even when greatly diluted in solvent, typically do not remain free of crystals at low temperatures.

TOFA is separated from other tall oil components through distillation; however, during the distillation process unsaponifiable and sulfurized materials tend to co-distill with TOFA. Additional distillation to purify tall oil fatty acid further, increase cost of production; in addition additional distillation may produce materials with more than the desired amount of rosin acid and unsaponifiable tall oil species in the final tall oil fatty acid.

High sulfur content in tall oil products, not only hinders its use as fuel additives in fuels it also impacts the usefulness of tall oil products in other, useful value-added chemistries. For example, sulfur content can inhibit the hydrogenolvsis of tall oil products into alcohols. Another example is the hydrogenation of dimer acids as well as monomer. Sulfur species in conventional tall oil can contaminate hydrogenation catalysts, thus "killing" or "poisoning" the catalyst and making the conversion of such conventional tall oil products very economically inefficient and undesirable. Thus, there exists a need to create tall oil products from renewable resources in a manner so as to ensure low sulfur content therein and maintain low temperature stability thereof.

U.S. Patent Application No. 20070049727, published Mar. 1, 2007 by Pollock et al., discloses low sulfur tall oil fatty acid compositions, as well as methods of using and making the same using distillation and adsorption, with the adsorbent disclosed as clay, acid-activated clay, silica, activated carbon containing compound, diatomaceous earth, or combinations and/or mixtures thereof.

WO Patent Application No. 2007/050030 describes how biodiesel fuel is produced from crude tall oil (CTO), by first heat-treating the CTO in order to remove the sulfur compounds and then mixing into the CTO C1-C8 alcohols, particularly methanol or ethanol, leaving the mixture to become at least partly esterified in a mixing tank reactor, followed by generating and then separating water and alcohol in a distillation column. Following these treatments, the alcohol and the water are distilled apart from each other and finally, an esterified fatty acid is removed by fractionation from the resin acids, in the third distillation column.

U.S. Application No. 20090217573, published Sep. 3, 2009, by Stigsson, discloses automotive fuels and fine chemicals from crude tall oil. The method for manufacturing fatty acid alkyl esters from tall oil comprises the steps of a) esterifying tall oil in at least one esterification reactor in the presence of an acidic catalyst and an C1 to C8 alcohol to form a crude product stream comprising fatty acid alkyl esters and water, b) separating water and alcohol from the crude product stream formed in step a) to form a dehydrated fatty acid alkyl ester product stream, and c) separating dehydrated fatty acid alkyl ester product stream from step b) into at least two product streams wherein one product stream is enriched in fatty acid alkyl esters and one product stream is enriched in resin acid compounds. There are disclosed fatty acid alkyl esters and resin acids manufactured by the method. Moreover there is disclosed a fuel composition and its use as an automotive fuel, said fuel composition comprises the fatty acid alkyl esters produced according to the present invention.

WO/2009/153408, published Dec. 23, 2009, by Saviainen, discloses methods and apparatus for producing motor fuel. Specifically, a method and an arrangement for maximizing the yield of fatty acids, which are associated with the process of the refining of tall oil and, at the same time, producing from them fatty acid esters, particularly methyl esters, for use as fuel. According to the present invention, crude tall oil is first treated with formic acid, with which the alcohol groups are esterified. After the separation of the pitch and resin, the crude fatty acids are esterified in a primary oil column of a refinery, where the water generated and the excess alcohol derived from the process of the esterification are removed by distillation. Generally, the fatty acids, which end up in the primary oil and the bottoms products, are also mainly esterified, according to the present method, and thus it is possible to maximize the amount of the fuel esters (FAME).

However, in spite of the above advancements, there exists a need in the art for a low sulfur fuel additive composition, and methods of making such composition.

There even also exists a need in the art for a low sulfur fuel additive that provides improved lubricity and low temperature properties to a fuel additive composition and also to the subsequent finished fuel.

There also exists a need in the art for a low sulfur fuel, and methods of making such fuel.

These and other needs in the art will become apparent to those of skill in the art upon review of this specification, including its drawings and claims.

SUMMARY OF THE INVENTION

It is an object of the present invention to provide for a low sulfur fuel additive composition, and methods of making such composition.

We have discovered that the sulfur content in tall oil fatty acid increase with the level of tall oil rosin content in the tall oil fatty acid. In addition, we have found that, by esterifying a tall oil fatty acid stream having tall oil rosin and sulfur species to create an esterified tall oil stream, sulfur species in the tall oil stream can be more easily separated by distillation. We have found further, that addition of a heat treating step prior to esterification and distillation can further improve separation of sulfur species from an esterified tall oil stream. Finally, we have discovered that saponifying and then acidifying the esterified tall oil stream produces a fuel additive that has less than 15 ppm by weight sulfur, meeting requirements of additives to ultra-low sulfur diesel fuels.

According to one embodiment of the present invention, there is provided a method of processing tall oil fatty acid stream comprising a first level of sulfur. The method includes esterifying the tall oil fatty acid stream with a C1 to C9 alcohol to produce a tall oil fatty acid ester stream with a second level of sulfur less than the first level of sulfur. The method may also include distilling the tall oil fatty acid stream to recover a distillate stream having a third level of sulfur less than the second level of sulfur. The method may also include saponifying and acidizing the distillate stream to provide a final tall oil fatty acid stream with a final level of sulfur less than the second level of sulfur.

According to another embodiment of the present invention, there is provided a fuel additive. The fuel additive may include a tall oil fatty acid and a sulfur compound, wherein the sulfur compound comprises from 0.1 to 15 of the additive.

According to even another embodiment of the present invention, there is provided a fuel that may include a hydrocarbon component, a tall oil fatty acid, and a sulfur compound, wherein the sulfur compound comprises from about 0.1 to about 15 ppm of the fuel.

According to still another embodiment of the present invention, there is provided a method of treating a hydrocarbon fuel. The method may include contacting the hydrocarbon fuel with an additive, wherein the additive comprises tall oil fatty acid and a sulfur compound, wherein the sulfur compound comprises from about 0.1 to about 15 ppm of the additive.

These and other embodiments of the present invention will become apparent to those of skill in the art upon review of this specification, including its drawings and claims.

DETAILED DESCRIPTION OF THE INVENTION

In the practice of embodiments of the present invention, cost efficient methods are provided to produce tall oil fatty acid materials and derivative having low unsaponifiable tall oil species, low tall oil rosin content, and low sulfur content.

Certain non-limiting embodiments of the present invention provide that rosin acids and unsaponifiable tall oil species can be drastically reduced, when the fatty acids are selectively esterified and distilled. These embodiments allow production of fatty acid derivatives that have lower sulfur content than could be previously achieved by multiple distillations of fatty acids. For various embodiments the low rosin and sulfur TOFA derivative may also successfully be converted back to TOFA with a sulfur content of 20 ppm, 19 ppm, 18, ppm, 17 ppm, 16 ppm, 15 ppm, 14 ppm, 13 ppm, 12 ppm, 11 ppm, 10 ppm, 9 ppm, 8, ppm, 7 ppm, 6 ppm, 5 ppm, 4ppm, 3ppm, 2ppm, 1 ppm, 0.1ppm or 0.01 maximum (depending upon the embodiment. Certain non-limiting embodiments of the present invention also present a cost effective method for producing low unsaponifiable tall oil species, low rosin, and low sulfur composition compared to products obtained via multiple distillation or adsorption methods.

In the practice of embodiments of the present invention, tall oil fatty acid and derivatives having low unsaponifiable tall oil species, low rosin, and low sulfur can be produced by selectively methylating the fatty acids and leaving the rosin acids, followed by distillation with of methylated fatty acid with or without a neutralization and filtration step. The various embodiments of the present invention may utilize a wide variety of TOFA. Generally TOFA suitable for use in the present invention may be described as having suitably low starting sulfur content, generally less than 100, 90, 80, 75, 70, 65, 60, 55, 50, 45, 40, 35, 30, 25 ppm sulfur. In most embodiments, the higher the initial TOFA sulfur content, the more difficult it is to obtain a final sulfur content meeting regulation limits of less than 15 ppm. It may be useful, prior to the esterification step, it is desirable pretreat to reduce the starting TOFA sulfur content and thus more readily allow a final sulfur content of less than 15 ppm. As a non-limiting example, if the TOFA initial sulfur content is greater than 70, 65, or 60 ppm, pretreatment will be employed to reduce the sulfur content to below 70, 65, or 60 ppm, respectively, prior to esterification.

Some embodiments of the present invention may utilize TOFA that may be described as a liquid mixture of unsaturated C18 fatty acids obtained from black liquor soap, a by product from the Kraft papermaking process. Such C18 fatty acids are distilled from crude tall oil, an acidulated black liquor soap product from the Kraft process. Suitable TOFA may be described as a mixture of unsaturated monocarboxylic C18 fatty acids and C20 rosin acids (10% by weight maximum). As a non-limiting example, the primary components of tall oil fatty acids may include C 18:1 oleic and C 18:2 linoleic acids with minor amounts of unsaturated C18:3 linoleic types, saturated C16:0 palmitic and C18:0 stearic acids, The inventors have found that very low levels of sulfur can be obtained more reliably by heat treatment of TOFA prior to esterification. Specifically, in the practice of the present invention, TOFA with higher levels of sulfur may be subject to a heat treatment step prior to use, in which the TOFA is held at temperatures ranging to/from or between any two of the following temperatures of 160 C, 170 C, 180 C, 190 C, 200 C, 210 C, 220 C, 230 C, 240 C, 250 C, 260 C, 270 C, 280 C, 290 C, 300 C, 325 C, 350 C, 400 C Non-limiting examples of suitable heat treatment temperature ranges includes 180 C to 300 C, and 220 C to 240 C.

The heat treatment time will range to/from or between 0.1 hrs, 0.3 hrs, 0.5 hrs, 1 hr, 2 hrs, 3 hrs, 4 hrs, 5 hrs, 6 hrs, 7 hrs, 8 hrs, 9 hrs, 10 hrs, 15 hrs, 24 hrs, 48 hrs and 72 hrs. For example, the heat treatment time may range from 0.1 hrs to about 5 hours.

The heat treatment is applied sufficiently to reduce residual rosin content to less than 0.3, 0.5%, 1%, 1.5%, 2%, 2.5% or 3% (as measured by the wet method) or less than 0.5% 1%, 2%, 3%, 4% or 5% (as measured by GC). In some embodiments it may be possible to reduce rosin content to as low as 0.5% (GC) or 0.3% (wet), or lower.

The methods of the present invention may include esterification of the TOFA. The objective of esterification is to form fatty acid alkyl esters in high yield. In general, the TOFA is esterified with an alcohol usually in the presence of a catalyst.

In the practice of the present invention, the alcohol may be of the general form ROH, wherein R is a hydrocarbon having 1, 2, 3, 4, 5, 6, 7, 8, or 9, carbon atoms, or having carbon atoms ranging from/to or between any two of the foregoing numbers. A non-limiting example of a suitable range includes C1 to C9 alcohols to produce fatty acid alkyl esters in which the may be a linear, branched, cyclic and/or aromatic hydrocarbon. Non-limiting examples of suitable alcohols include methanol, ethanol, iso-propanol, and 2-Ethylhexyl alcohol.

In general, the physical conditions in the reactor or reactors and the catalyst may be selected so that fatty acids in the tall oil are esterified in preference to resin acids. Fatty acids with primary carboxylic acid groups are esterified at milder conditions relative to resin acids.

In the practice of the present invention, the esterification will generally be carried out at any temperature suitable to provide the desired esterification of the TOFA species. Generally the esterification temperature will range from/to or between any two of 50 C, 60 C, 70 C, 80 C, 90 C, 100 C, 110 C, 120 C, 130 C, 140 C, 150 C, 160 C, 170 C, 180 C, 190 C, 200 C, 210 C, 220 C, 230 C, 240 C, 250 C, 260 C, 270 C, 280 C, 290C, or 300 C. Non-limiting examples of suitable esterification temperature ranges includes 50 C to 250 C, and 65 C to 140 C. Again, in some embodiments, the temperature will be selected to provide that fatty acids in the tall oil are esterified in preference to resin acids.

In the practice of the present invention, the esterification will generally be carried out at any molar ratio of TOFA to alcohol suitable to provide the desired esterification of the TOFA. In some embodiments, the molar ratio will be selected to provide that fatty acids in the tall oil are esterified in preference to resin acids. In some embodiments, a stoicheiometric surplus charge of alcohol may be used to drive the conversion of TOFA to fatty acid alkyl esters to completion. The stoicheiometric ratio of alcohol to fatty acids ranges from/to or between any two of 1.05:1, 1.1:1, 1.5:1, 1.75:1, 2:1, 3:1, 4:1, 5:1, 10:1 and 20:1. As a non-limiting example, the stoicheiometric ratio of alcohol to fatty acids may be on the order of 1.1:1 to 3:1. In the practice of the present invention, some non-limiting embodiments may carry out the esterification to a higher acid value before distillation.

In the practice of the present invention, esterification will generally be carried out at using a reaction time suitable to provide the desired esterifcation of the TOFA. The esterificaton time will range to/from or between 0.1 hrs, 0.3 hrs, 0.5 hrs, 1 hr, 2 hrs, 3 hrs, 4 hrs, 5 hrs, 6 hrs, 7 hrs, 8 hrs, 9 hrs, 10 hrs, 15 hrs, 24 hrs, 48 hrs and 72 hrs. As a non-limiting example, the esterification time may range from 0.1 hrs to about 5 hours.

In the practice of the present invention, the esterification step may be carried out in the presence of a catalyst. While it is believed that any suitable catalyst may be utilized, including sulfur based catalyst, the use of sulfur based catalyst may introduce additional sulfur to the final product. Thus, preferred embodiments will utilize a non-sulfur based catalyst so as to not introduce any more sulfur. A non-limiting example of a suitable catalyst includes an alkyl metal oxide catalyst, such as dibutyl tin oxide (DBTO).

Use of a homogeneous catalyst to catalyze the esterification reactions may in some embodiments be implemented with structured packing internals. One the other hand, a heterogeneous catalyst may in some embodiments be immobilized by a column packing structure such as for example Katapak by Sulzer Chemtec.

When a catalyst is added, it may be present in the range between or from/to any two of the following 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, and 10% based on the weight of TOFA.

The esterification reaction converting fatty acids in TOFA in accordance with the present invention may be performed in batch, or semi-batch, or continuous reactors. For example a portion of the esterification reaction may be carried out in continuous reactor such as continuous stirred tank reactors (CSTR), or in a static mixer configuration.

As another non-limiting example, a suitable reactor system for performing the esterification reactions may include reactive distillation technology alone or in combination with at least one CSTR. As another example, a suitable arrangement includes refluxing excess alcohol as an alternative to active distillation. As even another non-limiting example, the esterification reaction may be performed using at least one continuous stirred tank reactor (CSTR) and at least one reactive distillation reactor in series.

Once TOFA material has been subject to the esterification step to form an esterified tall oil stream, this esterified tall oil stream is then distilled to and a an esterified TOFA distillate recovered. This distillation is carried out as is known in the art.

For example, a distillation column, a short path evaporator or any other type of efficient evaporator operated under vacuum can be used to separate the fatty acid alkyl esters from the higher boiling resin acids and neutrals. The vacuum pressure is selected considering the feed tall oil composition, particularly fatty acid to resin acid ratio. For example the vacuum may be in the range of 1 bar down to 0.0005 bar, preferably 0.8 to 02005 bar. It may be possible that most undesired organo-sulfur compounds can be removed at this point in the process.

In this invention, the recovered esterified TOFA distillate is then subjected to saponification and acidulation to provide the final low sulfur TOFA product. The final low sulfur TOFA product will have a sulfur content between or from/to any two of the following 20 ppm, 19 ppm, 18ppm, 17 ppm, 16 ppm, 15 ppm, 14 ppm, 13 ppm, 12 ppm, 11 ppm, 10 ppm, 9 ppm, 8, ppm, 7 ppm, 6 ppm, 5 ppm, 4 ppm, 3 ppm, 2 ppm, 1 ppm, 0.1 ppm or 0.01 ppm. We have found that a process comprising heat treatment, esterification, saponification, and acidulation will provide a final product with 0.01 to 15 ppm TOFA reliably.

In the practice of the present invention, some embodiments may utilize adsorption in combination with the esterification and distillation. Generally the adsorption will be carried out prior to the esterification, but certainly could be carried out at any time during the process.

The present invention is useful for providing TOFA and derivatives low rosin, low sulfur, and low unsaponifiable tall oil species which can be used as lubricity additives for ultra-low sulfur diesel (ULSD). Alternatively, the TOFA and derivatives from this invention can be useful for production of PVC additives or biodiesel.

Biodiesel refers to diesel fuel consisting of long-chain alkyl esters. derived from vegetable oils or animal fat (tallow). Biodiesel is typically made by chemically reacting such oils and fats with alcohols to produce fatty acid esters. Biodiesel is meant to be used in standard diesel engines, and can be used alone or blended with petro diesel Biodiesel can also be used as a low-carbon alternative to heating oil.

In order to qualify as ultra-low sulfur diesel, however, biodiesel must have, at most, 15 ppm by weight of sulfur. Tall oil fatty acid esters often contain too much sulfur to qualify as ultra-low sulfur diesel. However, we have discovered that distilling TOFA esters with the method of this invention can remove the sulfur compounds. In particular, if TOFA is heat treated before esterification, an esterified tall oil material can be produced with sulfur levels reliably below 15 ppm.

DETAILED DESCRIPTION OF DRAWINGS

The inventors do not believe the drawings are necessary to understand the invention, but include them here as examples for clarification.

Figure 1:
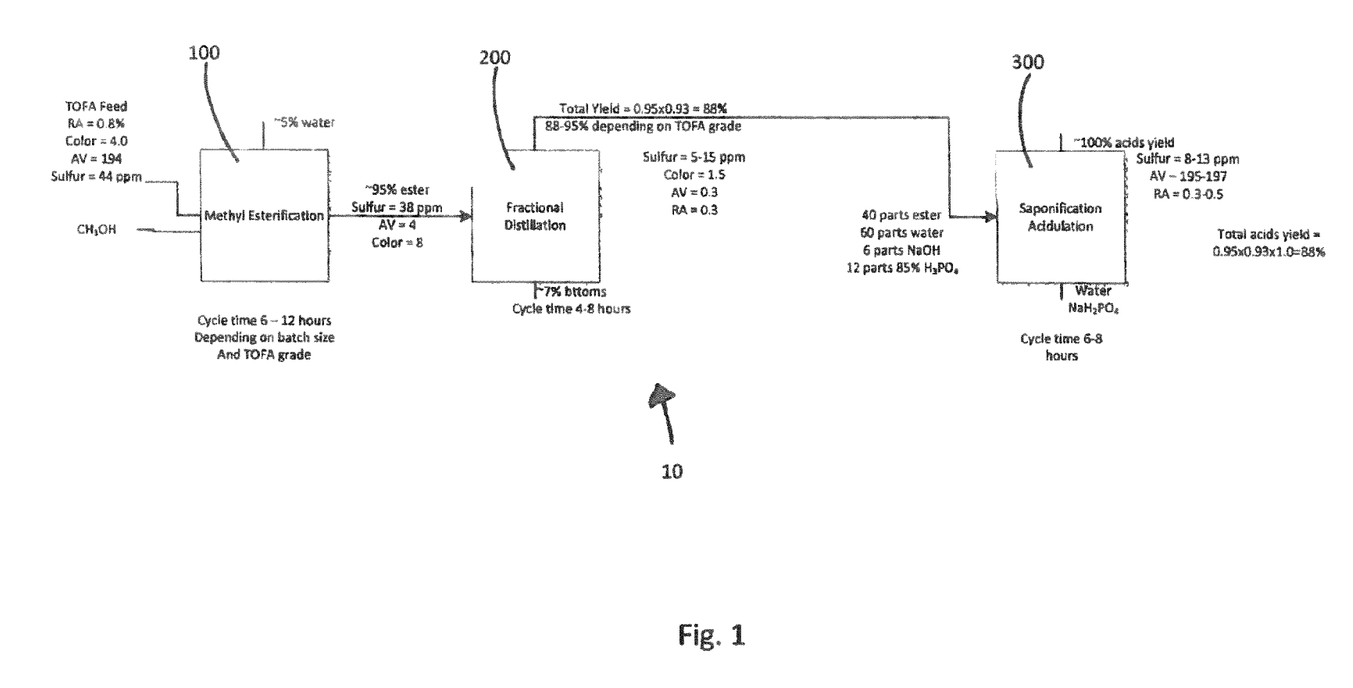
FIG. 1 is a schematic representation of one non-limiting embodiment 10 of the present invention, showing esterification step 100, distillation step 200 and saponification/acidulation step 300.

FIG. 1 illustrates a schematic representation of one non-limiting embodiment 10 of the present invention, showing esterification step 100, distillation step 200 and saponification/acidulation step 300. In the embodiment as shown, TOFA feed with sulfur content of 44 ppm is esterified with methanol 100. The resultant ester has a sulfur content of 38 ppm and is then subjected to distillation 200. The ester recovered in the overhead stream has a sulfur content in the range of about 5 to 15 ppm. TOFA recovered after saponification and acidulation 300 has a sulfur content in the range of about 8 to 13 ppm.

Figure 2:
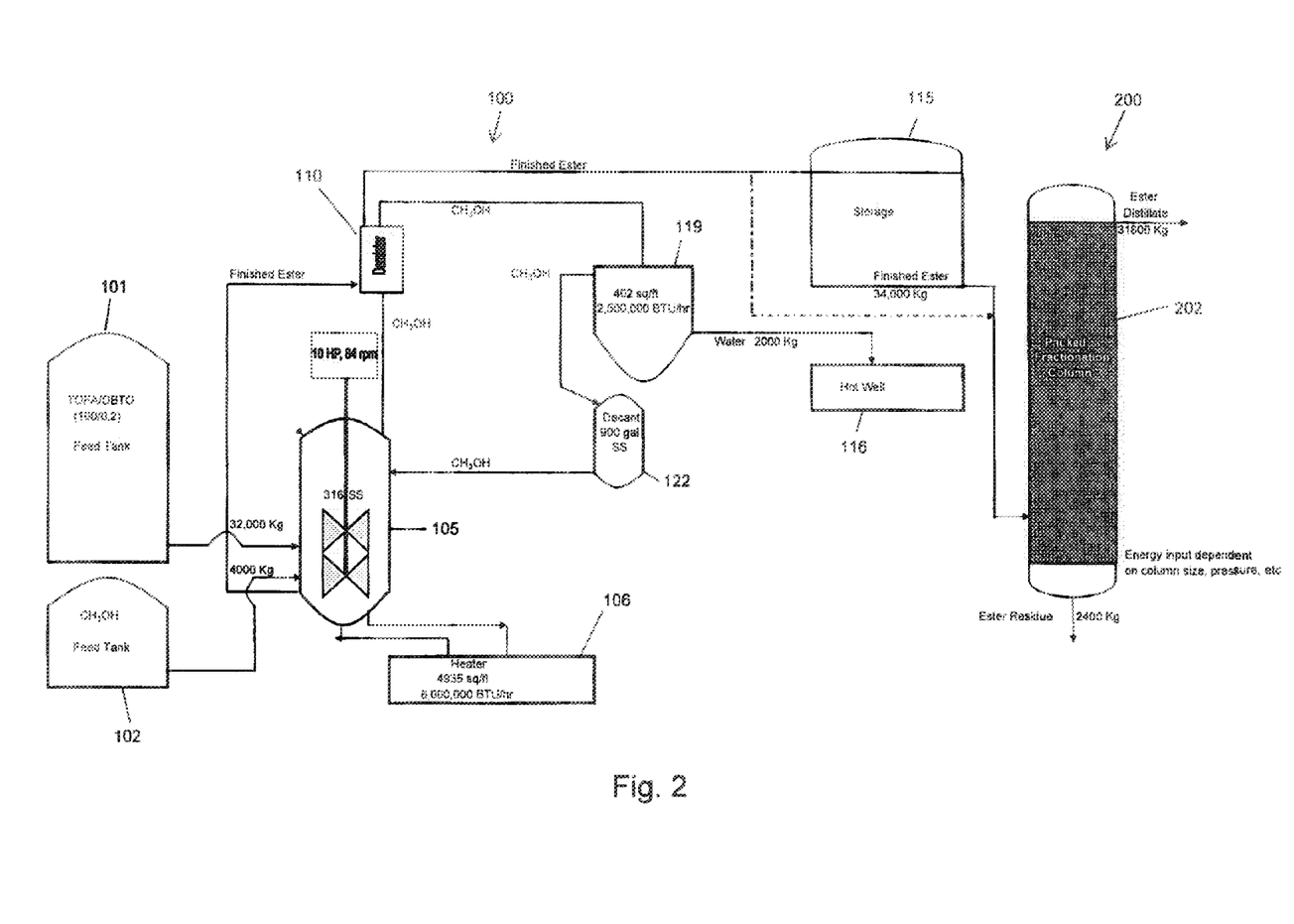
FIG. 2 is a schematic representation of one non-limiting embodiment of the present invention showing esterification step 100 and distillation step 200.

FIG. 2, illustrates a schematic representation of one non-limiting embodiment of the present invention showing esterification 100 and distillation 200 to produce a fatty acid methyl ester (FAME) suitable for use as a biodiesel. Feed tank 101 provides a mixture of TOFA and dibutyl tin oxide catalyst (DBTO), and feed tank 102 provides methanol to esterification reactor 105 (represented as a stirred tank reactor). The reactants are circulated through a heat exchanger 106 for heat treatment. Finished ester travels to demister 110 with portions further traveling to storage tank 115 and heat exchanger 119. Water from heat exchanger 119 is provided to hot well 116. Methanol from heat exchanger 119 is provided to decant tank 122 before being recirculated back to esterification reactor 105. Finished ester is provided to distillation column 202, where ester distillate and ester residue recovered.

Figure 3:
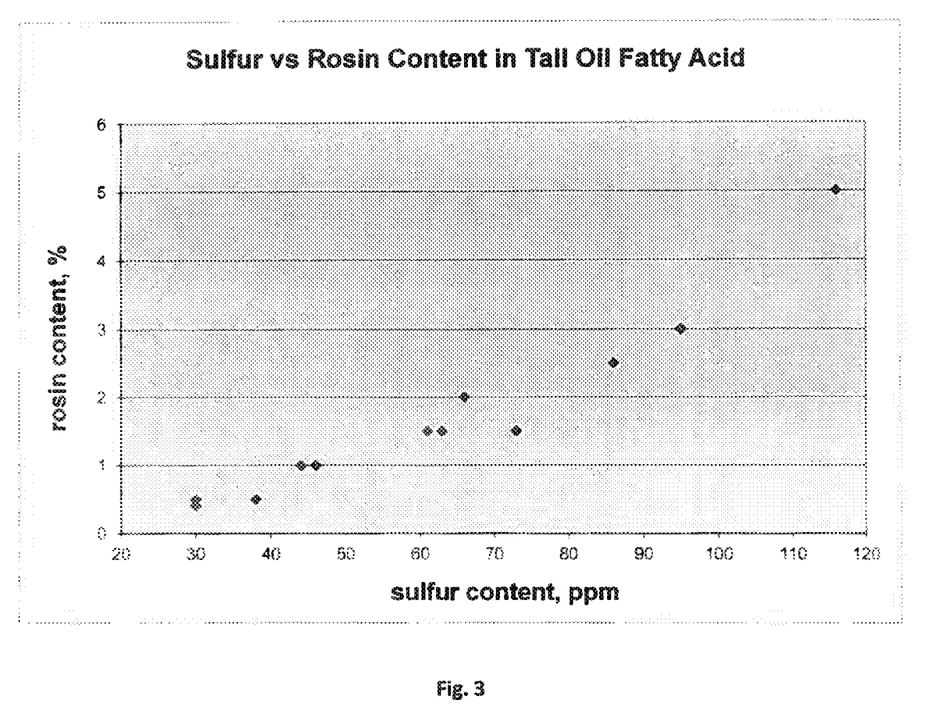
FIG. 3 is a graph of data showing sulfur content as a function of rosin content in tall oil fatty acid.

FIG. 3 is a graph of sulfur content, measured on a number of TOFA samples having different rosin ester content. In general, the sulfur content increases with increasing rosin ester content.

EXAMPLES

TOFA, with catalyst at 0.2%, is heated to 220° C. Methanol is added, subsurface, at approximately 2 mL/min until AV reaches 5-10, depending on TOFA grade used. Cycle time ranges from 6-16 hours depending on batch size, catalyst, and other factors. Ester yield is approximately 97% using DBTO (di-n-butyl tin oxide). The ester is then fractionally distilled. Pot temperature ranges from 185-220° C. and distillate temperature from 145-160° C. at ~1 mm Hg vacuum. Distillate yield ranges from 87-95% depending on TOFA feed. The ester distillate is then saponified using 50% NaOH at 10-15% excess based on saponification value of ester. The saponification is at 40% ester in water. When completely saponified, the tall oil fatty acids are reclaimed using phosphoric acid. Both the saponification and acidulation are conducted at 80-90° C. Yield of reclaimed acids is near 100%.

Methyl esters of various TOFA grades and blends of TOFA grades are prepared and distilled to achieve a methyl ester distillate with low sulfur content (<20 ppm) and low RA (<0.5%, wet method).

A summary of data on samples esterification and distillation with different TOFA grades is provided in the following Table 1.

TABLE 1

| Product | Fatty Acid Content (%) | Rosin Acid Content (%) | Sulfur (ppm) | Acid Number | Color (Gardner) | Distillate Yield (%) |
|---|---|---|---|---|---|---|
| SYLFAT FA1 | 94.17 | 5.83 | 70.6 | | | |
| SYLFAT FA1 Ester | | | | 7.1 | | |
| SYLFAT FA1 Ester (Distillate) | 98.42 | 1.58 | 25.9 | | 1.4 | 90 |

TABLE 1-continued

| Product | Fatty Acid Content (%) | Rosin Acid Content (%) | Sulfur (ppm) | Acid Number | Color (Gardner) | Distillate Yield (%) |
|---|---|---|---|---|---|---|
| SYLFAT BKS | 97.5 | 2.35 | 44 | | | |
| SYLFAT BKS Ester | 99.28 | 0.72 | 38 | 4 | | |
| SYLFAT BKS Ester (Distillate) | 98.51 | 1.49 | 12 | 0.9 | 1 | 95 |
| SYLFAT 2 | 95.76 | 2.59 | 60.4 | | | |
| SYLFAT 2 Ester | 96.05 | 3.29 | 55.9 | 3.8 | | |
| SYLFAT 2 Ester (Distillate) | 98.8 | 1.2 | 12 | 0.72 | 0.5 | 90 |
| Competitive FAME 1 | 97.43 | 2.47 | 53 | 0.54 | 5.7 | |
| Competitive FAME 1 (Distillate) | 97.79 | 0.49 | 17 | 0.39 | 1.4 | 93 |
| Commercial FA | 97.22 | 3.04 | 52 | | | |
| Commercial FAME 2 | 93.1 | 3.36 | 47.1 | 8.9 | | |
| Commercial FAME 2 (Distillate) | 96.64 | 1.18 | 14.8 | 3.4 | 1.4 | 90 |

Saponification and Re-acidulation of TOFA Methyl Ester Distillates

Methyl ester distillate of the BKS sample was saponified using NaOH at 40% in NaOH/Water, with NaOH at a 10% excess, with results shown in Table 2. When the ester was fully saponified, the esters were re-acidulated using H3PO4, and the aqueous layer removed. This process yielded approximately 100% recovery of the acids, with TOFA having and acid value ranged from 196 to 198. Compared to the distillate sulfur level increased slightly, and the TOFA had a slightly higher color reading.

TABLE 2

| Analytical Test | 20% solids BKS ester | reclaim acids | 40% solids BKS ester | Distillate | reclaim acids | Distillate | 40% solids reclaim acids |
|---|---|---|---|---|---|---|---|
| AV | 3.0 | 197.6 | 2.8 | 0.4 | 197.6 | 0.9 | 194.5 |
| Sulfur | 37.7 | 18.5 | 43.0 | 9.6 | 11.7 | 14.4 | 14.4 |
| Color | 8.1 | 4.0 | 8.0 | 0.5 | 4.2 | 1.0 | 5.4 |
| RA by GC | | 1.35 | 2.55 | 0.72 | 2.42 | 1.49 | 2.26 |
| RA, wet | | | 1.00 | 0.20 | | | |
| % Moisture | | | | | 0.10 | | 0.11 |

Prior to application of a heat treatment, sulfur ran upper 80-90 on SYLFAT™ FA1Starting with those TOFAs, the resulting FAME distillate was not below 15 ppm sulfur. With a heat pretreatment, FA1 has sulfur content running mid and upper 70s ppm and FA1SP has sulfur content running around 70 ppm. Using FA1 SP resulted in methyl ester distillates as low as 11 ppm. The heat pretreatment was carried out for a 2 hr residence time (RT) at a temperature of 495 F. With heat pretreatment, SYLFAT made FAME distillate at 10 to 13 ppm, and SYLFAT 2 made FAME distillate at 540 ppm. The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A method of processing tall oil fatty acid stream comprising a first level of sulfur, the method comprising:
    (A) esterifying the tall oil fatty acid stream with an alcohol to produce a tall oil fatty acid ester stream with a second level of sulfur less than the first level of sulfur;
    (B) distilling the tall oil fatty acid ester stream to recover a distillate stream having a third level of sulfur less than the second level of sulfur; and,
    (C) saponifying and acidizing the distillate stream to provide a final tall oil fatty acid stream with a final level of sulfur less than the second level of sulfur.

2. The method of claim 1, wherein the alcohol is a C1 to C9 alcohol.

3. The method of claim 1, wherein the alcohol is selected from the group consisting of methanol, ethanol, iso-propanol, and 2-ethylhexyl alcohol.

4. The method of claim 1, wherein the alcohol is methanol.

5. The method of claim 1, wherein the final level of sulfur ranges from 0.01 ppm to less than about 20 ppm.

6. The method of claim 1, wherein the final level of sulfur ranges from 0.01 ppm to less than about 15 ppm.

7. The method of claim 1, wherein step (A) is carried out in the presence of a catalyst.

8. The method of claim 1, wherein Step (A) is carried out in the presence of an alkyl metal oxide catalyst.

9. The method of claim 1, wherein Step (A) is carried out in the presence of dibutyl tin oxide.

10. The method of claim 1, wherein the alcohol is methanol, Step (A) is carried out in the presence of dibutyl tin oxide, and the final level of sulfur ranges from 0.01 ppm to less than about 15 ppm.

11. The method of claim 1, wherein prior to step (A) the fatty acid stream is first subjected to heat treatment.

\* \* \* \* \*